US012219015B2

(12) United States Patent
Rathbone et al.

(10) Patent No.: US 12,219,015 B2
(45) Date of Patent: Feb. 4, 2025

(54) METHOD AND SYSTEM FOR DATA COMMUNICATION NETWORK IN A VEHICLE

(71) Applicant: JAGUAR LAND ROVER LIMITED, Warwickshire (GB)

(72) Inventors: David Rathbone, Coventry (GB); Garry Perez, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 250 days.

(21) Appl. No.: 17/775,786

(22) PCT Filed: Nov. 11, 2020

(86) PCT No.: PCT/EP2020/081781
§ 371 (c)(1),
(2) Date: May 10, 2022

(87) PCT Pub. No.: WO2021/094385
PCT Pub. Date: May 20, 2021

(65) Prior Publication Data
US 2022/0417329 A1   Dec. 29, 2022

(30) Foreign Application Priority Data
Nov. 11, 2019   (GB) ...................................... 1916338

(51) Int. Cl.
*H04L 67/125*   (2022.01)
(52) U.S. Cl.
CPC ................................. *H04L 67/125* (2013.01)
(58) Field of Classification Search
CPC .................................................... H04L 67/125
See application file for complete search history.

(56) References Cited

U.S. PATENT DOCUMENTS

| 11,700,185 B2* | 7/2023 | Smith | H04L 43/04 |
| | | | 709/224 |
| 2017/0288951 A1* | 10/2017 | Kurauchi | H04L 43/0811 |
| 2020/0250246 A1* | 8/2020 | Meyer | B62J 45/20 |

FOREIGN PATENT DOCUMENTS

WO    WO2018125989 A2 *  7/2018  ............. H04L 29/12

OTHER PUBLICATIONS

Search Report under Section 17 for Application No. GB1916338.5 dated Aug. 11, 2020.
International Search Report and Written Opinion of the International Searching Authority for International application No. PCT/EP2020/081781 dated Jan. 26, 2021.

* cited by examiner

*Primary Examiner* — Frantz B Jean
(74) *Attorney, Agent, or Firm* — Carlson, Gaskey & Olds, P.C.

(57) ABSTRACT

Aspects of the present invention relate to a method of communication between a first electronic device operatively connected to a data communications network within a vehicle, and a second electronic device operatively connected to the data communications network, the method comprising: sending a first message between the first and second electronic devices, outputting a first control signal to cause the operative state of the first or second electronic device to be reset, in dependence on a response message not having been received within a time period equal to a predetermined time period threshold.

18 Claims, 7 Drawing Sheets

METHOD AND SYSTEM FOR DATA COMMUNICATION NETWORK IN A VEHICLE

TECHNICAL FIELD

The present disclosure relates to a method of monitoring the operative states of electric components operatively coupled to a vehicle communication network. Aspects of the invention relate to a method, to a controller, to an electric device and to a vehicle.

BACKGROUND

Current automotive vehicles comprise a plurality of different types of electronic control units. Power delivery to these electronic control units is often controlled by relays.

A problem that is encountered with current vehicle networks is that, sometimes, an electronic control unit (also interchangeably referred to as a node) may power up erroneously, or fail to shut down when required, and in doing so consumes power. This can often lead to car battery drain. This is particularly problematic when the vehicle is left overnight, and can lead to total battery drain.

In order to mitigate for this problem, since the 1980s, relay switches have been included in a range of electronic sub-systems in vehicles. The advantage of using a relay switch is that they require a power supply in order to maintain an electrical connection with the associated sub-system. In other words, for the associated sub-system to be on a power ON configuration, requires that the relay be powered by the power supply. When the power supply is cut to the relay, for example when the vehicle is powered off, then power is also cut to all electrical sub-systems.

Within the automotive industry there is a general desire to reduce vehicle build complexity, by reducing the apparatus required in a vehicle, and in particular in simplifying vehicle data communications networks, in part by reducing reliance on relay switches in ensuring the correct operation of electrical componentry coupled to the vehicle network.

It is an object of the present invention to address one or more of the shortcomings associated with the prior art.

SUMMARY OF THE INVENTION

Aspects and embodiments of the invention provide an electronic device, a vehicle data communications network, a vehicle, a controller, a method and a non-transitory computer readable storage medium as claimed in the appended claims.

According to an aspect of the present invention there is provided an electronic device configured to be operatively connected to a data communications network within a vehicle; the electronic device is configured to: transmit a first message to a further electronic device connected to the data communications network; and output a first control signal to cause the operative state of the further electronic device to be reset, in dependence on no response message having been received from the further electronic device within a time period from transmission of the first message equal to a predetermined time period threshold.

An advantage associated with this aspect is that electronic devices that are unresponsive, for example as a result of their underlying operating systems having crashed, are identified, and their operative state reset, where otherwise they would have remained in their unresponsive state continuing to draw battery power. In this manner, software-based solutions are able to replace the currently known relay systems. Doing so reduces manufacturing costs, makes the vehicle lighter and improves efficiency. The problem with a conventional software-based approach is that software is prone to malfunction or crashing. A crashed controller may continue to supply power to an electronic component after the vehicle has been powered off. As explained, the present invention solves this problem, providing the additional advantages associated with using a software solution over relays.

In some embodiments the electronic device may comprise at least one electronic processor having an electrical input for receiving messages and an electrical output for outputting control signals and at least one memory device electrically coupled to the at least one electronic processor and having instructions stored therein. Wherein the at least one electronic processor may be configured to access the at least one memory device and execute the instructions thereon so as to transmit the first message to the further electronic device connected to the data communications network, and output the first control signal to cause the operative state of the further electronic device to be reset, in dependence on no response message having been received within the time period from transmission of the first message equal to the predetermined time period threshold.

In some embodiments the first message may comprise a current operative state of the electronic device. In this way it is possible to monitor the operative state of a second electronic device using a first electronic device. Where a response to the first message is not received from the second electronic device, then it may be indicative that the second electronic device is in an unresponsive state and requires resetting. In certain embodiments the first electronic device may relate to an electronic control unit, whilst the second electronic device may relate to a domain controller. Accordingly, the present method may be implemented using an electronic device within the vehicle communications network, irrespective of its relative network position.

Optionally, the electronic device may be configured to transmit the first message in response to a request from the further electronic device for the current operative state of the electronic device.

Optionally, the electronic device may be configured to receive a second control signal from the further electronic device indicating an expected operative state, and upon receipt of such a second control signal the electronic device is configured to change its operative state from the current operative state to the expected operative state.

In this manner, the operative state of an electronic device operatively connected to the vehicle communications network may be changed to an expected operative state. For example, where it is determined that an electronic control unit is in an unexpected or undesirable operative state, the present invention may be used to change the operative state to the desired one. This helps to maintain the desired operation of the different operatively connected electronic devices.

In some embodiments, the first message may comprise a request for a current operative state of the further electronic device. The advantage of this feature is that it is not necessary to wait for an electronic device to inform the network of its operative state. Instead, other electronic devices have the ability to request this status information. This is particularly useful, for example, where the second electronic device comprises a domain controller, in which event the domain controller may initiate the present method by sending the first message requesting the operative state of the first electronic device, which may relate to an electronic control unit operatively coupled to the vehicle data communications network.

Optionally, upon receipt of a response message responding to the first message comprising an indication of a current operative state of the further electronic device, the electronic device may be configured to: determine if the current operative state of the further electronic device is consistent with an expected operative state; and output a second control signal to cause the operative state of the further electronic device to be changed to the expected operative state, if the current operative state of the further electronic device is not consistent with the expected operative state.

Optionally, the electronic device may be configured to: determine if the current operative state of the further electronic device is associated with a critical operation of the vehicle; and output the second control signal once the critical operation has been completed, if the current operative state is not consistent with the expected operative state.

This may prevent the system from inadvertently terminating functions before completion. For example, stopping a windscreen wiper halfway through its sweep, thus obstructing the driver's view. Similarly, this feature also prevents interference with safety critical functions, such as suspending the ABS (Anti-lock Braking System) system whilst it's engaged, before it has completed its function. In some embodiments each electronic device may comprise a rule-based priority list of actions to carry out upon receipt of a control signal to change its operative state. For example, one rule may be that any received control signal instructing a safety-critical function to be changed is only to be executed upon completion of the safety critical function. The rule-based priority list may be specified at firmware level.

Optionally, determining if the current operative state of the further electronic device is consistent with an expected operative state may comprise: accessing a database comprising a real-time database record of the expected operative state of the further electronic device; and determining if the current operative state of the further electronic device is consistent with the expected operative state, by comparing the current operative state with the expected operative state associated with the real-time database record.

Use of a database enables a complete record of the expected operative state of the electronic device to be easily maintained and accessed, and used to determine if an electronic device is operating in the state that it should be operating in.

Optionally, the electronic device may be configured to: receive a signal from a remote electronic device located remotely from the vehicle, the signal specifying a desired operative state of the further electronic device; and updating the expected operative state of the further electronic device in accordance with the desired operative state specified in the received signal from the remote electronic device.

This feature compensates for scenarios where control signals for affecting the operative state of electronic devices within the vehicle network originate from devices located remotely from the vehicle network, for example, a mobile telephone. In order to determine if an electronic device is operating in an expected operative state, is therefore also necessary to monitor control signals originating externally from the vehicle communications network.

According to a further aspect of the present invention there is provided an electronic device configured to be operatively connected to a data communications network within a vehicle; the electronic device is configured to: receive a first message from a further electronic device connected to the data communications network, wherein the first message comprises a current operative state of the further electronic device; determine if the current operative state of the further electronic device is consistent with an expected operative state; and output a response message to the further electronic device, the response message comprising a control signal to cause the operative state of the further electronic device to be changed to the expected operative state, if the current operative state of the first electronic device is not consistent with the expected operative state.

Optionally, the electronic device may be configured to: determine if the current operative state of the further electronic device is associated with a critical operation of the vehicle; and output the response message comprising the control signal to cause the operative state of the further electronic device to be changed to the expected operative state after the critical operation has been completed, if the current operative state is not consistent with the expected operative state.

Optionally, determining if the current operative state of the further electronic device is consistent with an expected operative state may comprise: accessing a database comprising a real-time database record of the expected operative state of the further electronic device; and determining if the current operative state of the further electronic device is consistent with the expected operative state, by comparing the current operative state with the expected operative state associated with the real-time database record.

Optionally, the electronic device may be configured to: receive a signal from a remote electronic device located remotely from the vehicle, the signal specifying a desired operative state of the further electronic device; and updating the expected operative state of the further electronic device in accordance with the desired operative state specified in the received signal from the remote electronic device.

Optionally, the operative state may comprise one of: a power status of the electronic device; and a mode of operation of the electronic device.

Optionally, the electronic device may comprise one of an electronic control unit and a vehicle communications network domain controller. Optionally, the further electronic device may comprise one of an electronic control unit and a vehicle communications network domain controller.

Optionally, at least one of the first message, the response message, the first control signal, and the second control signal may be compliant with the AutoSar™ vehicle data communications standard.

According to a further aspect of the present invention, there is provided a vehicle data communications network comprising an electronic device as herein described.

According to a further aspect of the present invention, there is provided a vehicle comprising an electronic device or a vehicle data communications network as herein described.

According to a further aspect of the present invention, there is provided a method of communication between a first electronic device operatively connected to a data communications network within a vehicle, and a second electronic device operatively connected to the data communications network, the method comprising: transmitting a first message from the first electronic device to the second electronic device; and outputting from the first electronic device a first control signal to cause the operative state of the second electronic device to be reset, in dependence on no response message having been received at the first electronic device within a time period from transmission of the first message equal to a predetermined time period threshold.

According to a further aspect of the present invention there is provided a method of communication between a first electronic device operatively connected to a data communications network within a vehicle, and a second electronic device operatively connected to the data communications network. The method may comprise: sending a first message between the first and second electronic devices, outputting a first control signal to cause the operative state of the first or second electronic device to be reset, in dependence on a response message not having been received within a time period equal to a predetermined time period threshold. An advantage associated with this aspect is that electronic devices that are unresponsive, for example as a result of their underlying operating systems having crashed, are identified, and their operative state reset, where otherwise they would have remained in their unresponsive state continuing to draw battery power. Software-based solutions would replace the currently known relay systems. Doing so reduces manufacturing costs, makes the vehicle lighter and improves efficiency. The problem with a typical software-based approach is that software is prone to malfunction or crashing. A crashed controller may continue to supply power to an electronic component after the vehicle has been powered off. As explained, the present invention solves this problem, providing the additional advantages associated with using a software solution over relays.

In certain embodiments of the invention the method may be initiated by the first electronic device, in which case the method may comprise the of sending the first message to the second electronic device, the first message may comprise a current operative state of the first electronic device, and the first control signal to cause the operative state of the second electronic device to be reset may be output, in dependence on the response message not having been received from the second electronic device within a time period equal to the predetermined time period. In this way it is possible to monitor the operative state of a second electronic device using a first electronic device. Where a response to the first message is not received from the second electronic device, then it may be indicative that the second electronic device is in an unresponsive state and requires resetting. In certain embodiments the first electronic device may relate to an electronic control unit, whilst the second electronic device may relate to a domain controller. Accordingly, the present method may be implemented using an electronic device within the vehicle communications network, irrespective of its relative network position.

In a further embodiment, the method may comprise determining if the current operative state of the first electronic device is consistent with an expected operative state, in dependence on the first message and the response message may be output to the first electronic device, the response message comprising a second control signal to cause the operative state of the first electronic device to be changed to the expected operative state, if the current operative state of the first electronic device is not consistent with the expected operative state. Advantageously, the present method may also be used to change the operative state of an electronic device operatively connected to the vehicle communications network to an expected operative state. For example, where it is determined that an electronic control unit is in an unexpected or undesirable operative state, the present method may be used to change the operative state to the desired one. This helps to maintain the desired operation of the different operatively connected electronic devices.

Optionally, the method may comprise the of determining if the current operative state of the first electronic device is associated with a critical operation of the vehicle and outputting the response message comprising the second control signal to cause the operative state of the first electronic device to be changed to the expected operative state after the critical operation has been completed, if the current operative state is not consistent with the expected operative state.

This prevents the system from inadvertently terminating functions before completion. For example, stopping a windscreen wiper halfway through its sweep, thus obstructing the driver's view. Similarly, this feature also prevents interference with safety critical functions, such as suspending the ABS (Anti-lock Braking System) system whilst it's engaged, before it has completed its function. In some embodiments each electronic device may comprise a rule-based priority list of actions to carry out upon receipt of a control signal to change its operative state. For example, one rule may be that any received control signal instructing a safety-critical function to be changed is only to be executed upon completion of the safety critical function. The rule-based priority list may be specified at firmware level.

In alternative embodiments of the invention the present method may be initiated by the second electronic device, in which case the method may comprise sending the first message from the second electronic device to the first electronic device. The first message may comprise a request for a current operative state of the first electronic device and outputting the first control signal to cause the operative state of the first electronic device to be reset, in dependence on the response message not having been received from the first electronic device within a time period equal to the predetermined time period threshold. The advantage of this feature is that it is not necessary to wait for an electronic device to inform the network of its operative state. Instead, other electronic devices have the ability to request this status information. This is particularly useful, for example, where the second electronic device comprises a domain controller, in which event the domain controller may initiate the present method by sending the first message requesting the operative state of the first electronic device, which may relate to an electronic control unit operatively coupled to the vehicle data communications network.

In some embodiments, the method may comprise determining if the current operative state of the first electronic device is consistent with an expected operative state, in dependence on the received response message; and outputting a second control signal to cause the operative state of the first electronic device to be changed to the expected operative state, if the current operative state of the first electronic device is not consistent with the expected operative state. Again, this feature helps to ensure the correct operation of electronic devices within the vehicle communications network In some embodiments, the method may comprise determining if the current operative state of the first electronic device is associated with a critical operation of the vehicle and outputting the second control signal, the second control signal to cause the operative state of the first electronic device to be changed to the expected operative state only once the critical operation has been completed, if the current operative state is not consistent with the expected operative state. The advantage of waiting until the end of a critical operation before turning off an electronic device has been discussed above. This is particularly useful where the second electronic device comprises a domain controller and the first electronic device comprises an electronic control unit.

In some embodiments, the of determining if the current operative state of the first electronic device is consistent with an expected operative state, comprises accessing a database comprising a real-time database record of the expected operative state of the first electronic device and determining if the current operative state of the first electronic device is consistent with the expected operative state, by comparing the current operative state with the expected operative state associated with the real-time database record. Use of a database enables a complete record of the expected operative state of the electronic device to be easily maintained and accessed, and used to determine if an electronic device is operating in the state that it should be operating in.

Optionally, the method may comprise the of receiving a signal from a third electronic device located remotely from the vehicle, the signal specifying a desired operative state of the first electronic device and updating the expected operative state of the first electronic device in accordance with the desired operative state specified in the received signal. This feature compensates for scenarios where control signals for affecting the operative state of electronic devices within the vehicle network originate from devices located remotely from the vehicle network, for example, a mobile telephone. In order to determine if an electronic device is operating in an expected operative state, is therefore also necessary to monitor control signals originating externally from the vehicle communications network.

Optionally, the first electronic device may be configured, in use, with one or more rules defining one or more actions to carry out in response to receipt of the first control signal, the method comprising carrying out the one or more actions following receipt of the first control signal prior to resetting the operative state of the first electronic device. This prevents the inadvertent termination of critical operations, before resetting the operative sate of the first electronic device.

In certain embodiments, the operative state of the first electronic device may comprise any one of: a power status of the electronic device and a mode of operation of the electronic device.

The first electronic device may comprise an electronic control unit, and the second electronic device may comprise vehicle communications network domain controller.

According to another aspect of the invention, there is provided a controller for determining the operative state of an electronic device operatively connected to a data communications network within a vehicle. The controller may comprise an output arranged in use to output a first message comprising a request for a current operative state of the electronic device, an input arranged in use to receive a response message from the electronic device indicating a current operative state of the electronic device. The output may be further arranged in use to output a first control signal to cause the operative state of the electronic device to be reset, in dependence on the response message not having been received from the electronic device within a time period equal to a predetermined time period threshold. The present aspect of the invention along with its embodiments benefits from the same advantages as set out in respect of the preceding aspect and its embodiments.

The controller may comprise a processor, arranged in use to determine if the current operative state of the electronic device is consistent with an expected operative state, in dependence on the received response message and wherein the output is arranged in use to output a second control signal to cause the operative state of the electronic device to be changed to the expected operative state, if the current operative state is not consistent with the expected operative state.

The processor may be arranged, in use, to determine if the current operative state of the electronic device is associated with a critical operation of the vehicle and the output may be arranged, in use, to output the second control signal to cause the operative state of the electronic device to be changed to the expected operative only once the critical operation has been completed, if the current operative state is not consistent with the expected operative state.

The processor may be operatively coupled to a database comprising a real-time database record of the expected operative state of the first electronic device, and the processor may be configured, in use, to access the database comprising the real-time database record of the expected operative state of the first electronic device and determine if the current operative state of the electronic device is consistent with the expected operative state, by comparing the current operative state with the expected operative state associated with the real-time database record.

In certain embodiments, any one of the first message, the response message, the control signal, and the second control signal may be compliant with the AutoSar™ vehicle data communications standard. The AutoSar™ data communications standard is widely adopted in current automotive vehicles, and ensuring compliance with it means that the methods of the present invention may be adopted in existing vehicles without undue burden, that already utilise the AutoSar™ vehicle data communications standard. This way, the existing The AutoSar™ data communications standard does not need to be modified.

According to another aspect of the invention, there is provided an electronic device operatively coupled to a data communications network in a vehicle for communicating with a controller. The electronic device may comprise an output arranged in use to send a first message to the controller, the first message comprising an indication of a current operative state of the electronic device, and an input arranged in use to receive a response message from the controller. The output may be further arranged, in use, to output a first control signal to cause the controller to be reset, in dependence on the response message not having been received from the controller within a time period equal to a predetermined time period threshold. This aspect of the invention, along with its embodiments, shares the same advantages as preceding aspects of the invention.

In accordance with an embodiment of the electronic device, the input may be arranged, in use, to receive a second control signal from the controller to cause the operative state of the electronic device to be changed to that of the expected operative state, if the current operative state is not consistent with the expected operative state.

The input may be arranged, in use, to receive a message from the controller querying the current operative state of the electronic device.

Any one of the first message, the response message, the first control signal, the second control signal, and the message querying the current operative state of the electronic device may be compliant with the AutoSar™ vehicle data communications standard.

According to another aspect of the invention, there is provided a vehicle configured to carry out the method of the previous aspect of the invention.

According to yet a further aspect of the invention, there is provided a vehicle comprising the controller, or comprising the electronic device of any one of the previous aspects of the invention.

According to a further aspect of the present invention, there is provided a non-transitory computer readable storage medium, comprising computer-executable code, for instructing a processor to carry out a method as herein described.

According to a further aspect of the present invention, there is provided a computer program product comprising instructions for carrying out a method as herein described.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
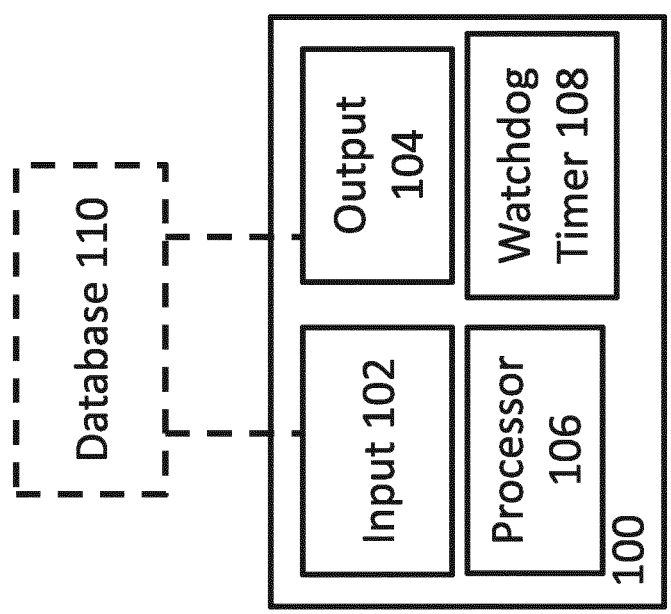
FIG. 1 is a schematic diagram illustrating the functional components of an electronic device and domain controller for use in a communications network of a vehicle, in accordance with embodiments of the invention.

A method in accordance with an embodiment of the present invention is described herein with reference to the accompanying FIG. 1, which is a schematic diagram of an electronic device 100, which may relate to, for example, an electronic control unit or a domain controller, and is configured to carry out the methods of the present invention. An object of the presently described embodiments is to ensure that an electronic device operatively connected to a vehicle data communications network is in an expected operative state, and where necessary to enable the operative state of the electronic device to be changed to an expected operative state. A domain controller may have no other controllers above it. Alternatively, a domain controller may have a controller above it, referred to as a central compute platform. A domain controller with a central compute platform above it may also be referred to as Remote I/O (RIO) controllers. The central compute platform can send out packages of data and control requests to the RIO controller.

With reference to the Figures, the electronic device 100 comprises an input 102 and an output 104, which enable the electronic device 100 to send and receive data communications over a communications network 200 within a vehicle 50. The input 102 is arranged to enable the electronic device 100 to receive control signals and data communication messages from other electronic devices, which may be operatively connected to the vehicular data communications network 200; and the output 104 is arranged to enable the electronic device 100 to transmit control signals and data communication messages to other electronic devices, which may be operatively connected to the vehicular data communications network 200, over the network. The data communication messages may comprise information regarding the current operative state of the electronic device 100, and/or they may comprise a request for information regarding the current operative state of another electronic device operatively connected to the vehicular data communications network 200. The output 104 is configured to output control signals to cause the operative state of other electronic devices operatively connected to the vehicular data communications network 200 to be changed. For example, this might be desirable where an operatively connected electronic device is in an undesired operative state, in which case it may be desirable to change the operative state of the device to a desired state.

In some embodiments, the electronic device 100 may also comprise a processor 106 and a timing module 108, which will henceforth be referred to as a watchdog timer. In certain embodiments the present methods may be carried out between a first electronic device having the functional configuration of FIG. 1 and a second electronic device operatively connected to the vehicular data communications network 200 having the same functional configuration of FIG. 1. The output 104 of the second electronic device may be arranged to transmit a first data communications message to the first electronic device. The first electronic device may be configured to receive the data communications message transmitted by the second electronic device, via its own input module 102. The first electronic device may respond to the received data communications message, by transmitting a response message to the second electronic device, via its output module 104. A data communication message for causing the operative state of the first electronic device to be changed may be output from the output 104 of the second electronic device, in dependence on no response message being received by the second electronic device upon expiry of a time period from transmission of the first data communications message equal to a predetermined threshold, as measured by the timing module 108.

The processor 106 of the second electronic device may be arranged in use to determine if the current operative state of the first electronic device is consistent with an expected operative state in dependence on the response message received from the first electronic device. The output 104 of the second electronic device may also be arranged to output control signals for causing the operative state of the first electronic device to be changed to the expected operative state, if the current operative state of the first electronic device is not consistent with the expected operative state.

In some embodiments, the processor 106 of the second electronic device may be operatively coupled to a database 110 comprising a real-time database record of the expected operative state of the first electronic device. The processor 106 of the second electronic device may be configured in use to access the database 110 comprising the real-time database record of the expected operative state of the first electronic device and determine if the current operative state of the first electronic device is consistent with the expected operative state.

Figure 2:
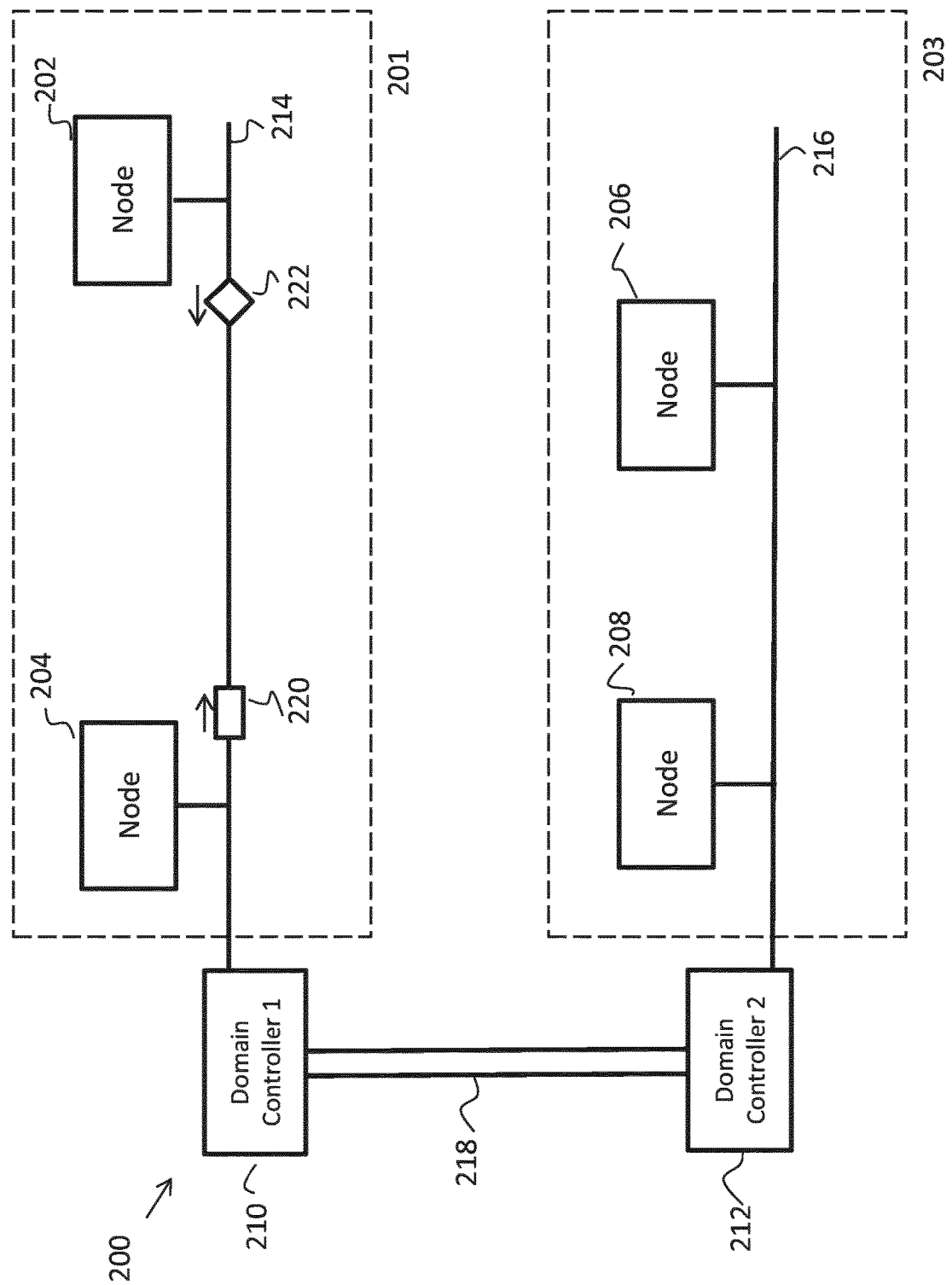
FIG. 2 is a schematic diagram of a data communications network in a vehicle, comprising several different operatively connected electronic devices of FIG. 1, including domain controllers.

The first electronic device may comprise an electronic control unit, and may be interchangeably referred to as a node operatively coupled to the vehicular data communications network 200. Within the present context, a node is intended to refer to any electronic device operatively connected to the vehicular data communications network, which carries out a function when actuated. The second electronic device may comprise a communications network domain controller. Within the present context, a domain controller relates to an electronic device configured to act as a gateway to a plurality of electronic devices operatively connected to a data bus. For example, it is common for the vehicular data communications network to be partitioned into different zones, in which each zone relates to a sub-network. For example, all the electronic devices required to control the cabin climate may be configured into a sub-network. Likewise the electronic devices relating to the powertrain may also be arranged to form a different sub-network. The electronic devices comprised in any one sub-network may all be operatively connected to a shared data bus, adopting a communication protocol such as FlexRay™, or any other AutoSar™ compliant communication protocol. Each communications sub-network may comprise a domain controller, which operatively connects each sub-network in parallel to other sub-networks via a higher speed shared data communications channel. This is illustrated in FIG. 2 and discussed in further detail below. Each domain controller monitors the activity of all the nodes located on the data bus it is connected to. Data may be shared between nodes located on different sub-networks, via the respective domain controllers and the associated high speed data communications channels. Where the second electronic device comprises a domain controller, the processor 106 may be operatively connected to the database 110.

FIG. 2 illustrates an example vehicle data communications network 200, highlighting a first 201 and second 203 sub-network operatively connected in parallel. The network contains nodes 202, 204, 206 and 208. Nodes 202 and 204 are connected to a communication channel or data bus 214 located on a first sub-network 201. Nodes 206 and 208 are connected to a communication channel or data bus 216 located on a second sub-network 203. Each communication channel or data bus is connected to a corresponding domain controller 210, 212. A first data bus 214 is connected to a first domain controller 210. A second data bus 216 is connected to a second domain controller 212. In practice the first and second data bus 214, 216 may comprise any one of: a CAN bus, a MOST bus, a FlexRay™ bus or a LIN bus. A high speed data communication channel 218 operatively connects the first domain controller 210 to the second domain controller 212. The high speed data communication link 218 may comprise, but is not limited to, an Ethernet data connection. A first data message 220 is shown being sent from the first domain controller 210 to a first node 202 via the first data bus 214. Similarly, a second data message 222 is shown being sent from the first node 202 to the first domain controller 210 via the first data bus 214. The illustrated nodes 202, 204, 206, 208 and domain controllers 210, 212 are non-limiting examples of an electronic device 100 as shown in FIG. 1, and each may comprise an input 102, an output 104, a processor 106 and a watchdog timer 108.

Figure 3A:
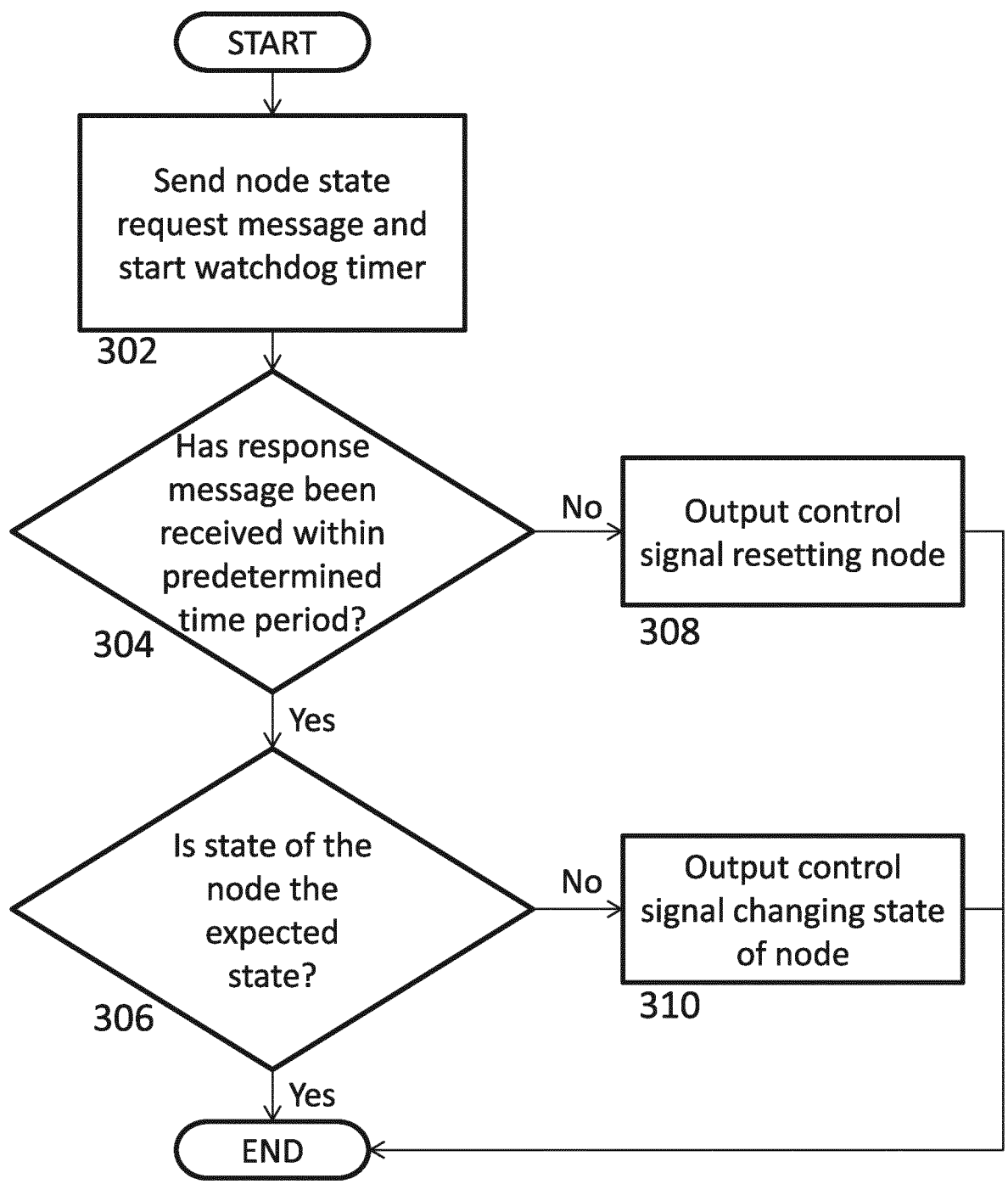
FIG. 3A is a process flow chart illustrating a method carried out by the domain controller of FIG. 1, for determining the operative status of another electronic device operatively connected to the vehicular data communications network of FIG. 2, in accordance with an embodiment.

FIG. 3A is a process flow diagram illustrating a method carried out by any one of the first or second domain controllers 210, 212 in determining the operative state of any one of the nodes operatively connected to its respective sub-network. For illustrative purposes, the method will be described with respect to the first domain controller 210. The first domain controller 210 may initiate the method by sending a first message to a first node 202 requesting the operative status of the first node 202, at 302. The first domain controller determines, at 304, if a response to the first message is received from the first node 202 within a predetermined threshold period of time. If no response is received within the predetermined timer period threshold, then the first domain controller 210 outputs a first control signal, which enables the operative state of the first node 202 to be reset, at 308. If instead a response message is received from the first node 202 within the predetermined time period threshold, then the first domain controller 210 determines, at 306, if the first node 202 is in the expected operative state. One way in which the first domain controller 210 may achieve this is by comparing the current operative state of the first node 202, to an expected operative state of the first node 202 comprised in a real-time database record associated with the first node 202. If the current operative state of the first node 202 is consistent with the expected operative state, then the process ends. However, if it is not, then the first domain controller 210 outputs a control signal to cause the current operative state of the first node 202 to be changed to the expected operative state, at 310.

Figure 3B:
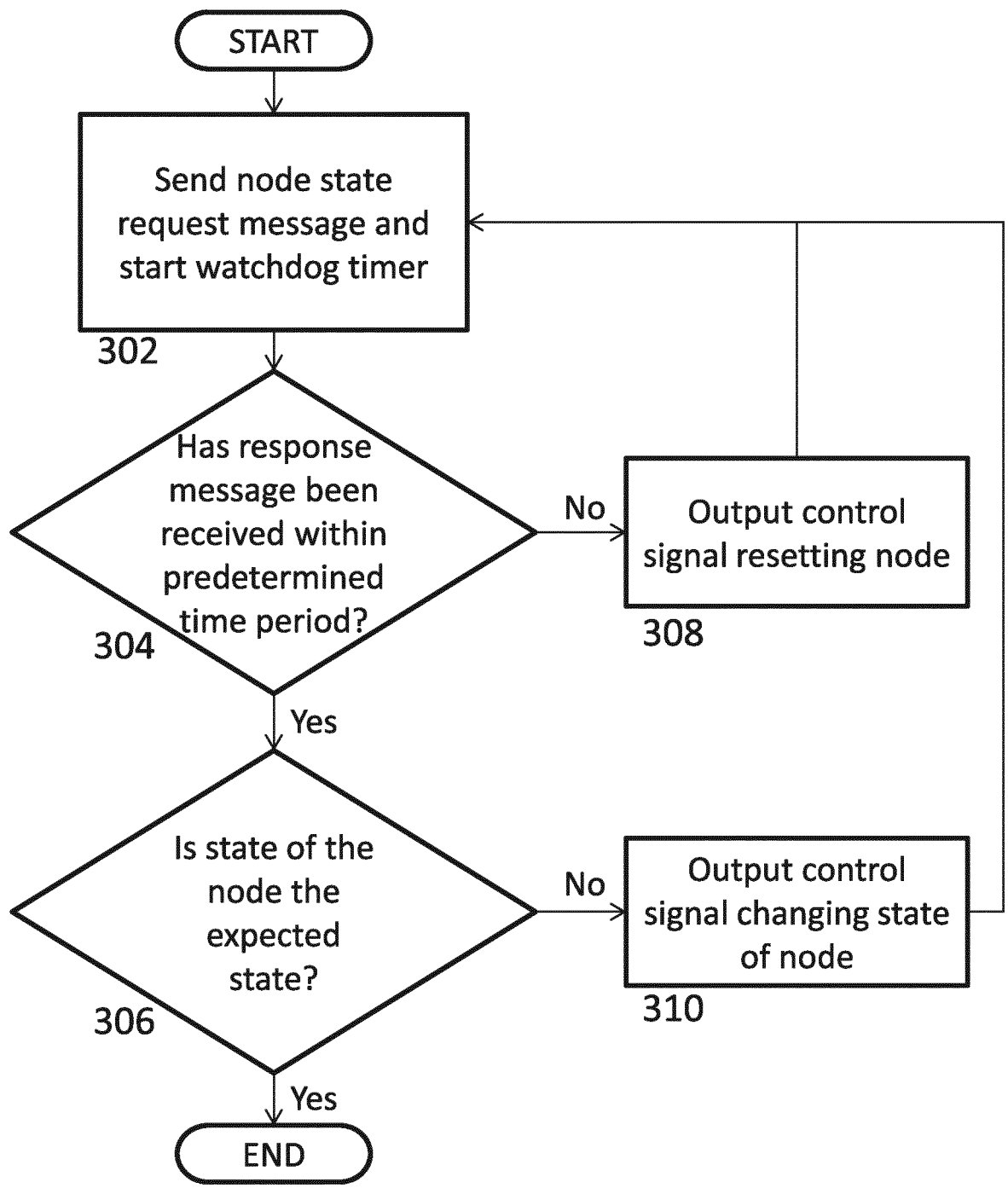
FIG. 3B is a process flow chart illustrating an alternative to the method of FIG. 3A, carried out by the domain controller of FIG. 1.

FIG. 3B illustrates a modified method that may be carried out by the first domain controller, in further embodiments of the invention. For present purposes, any steps that are shared with steps illustrated in the method of FIG. 3A, share the same reference numeral. The method of FIG. 3B differs from the method of FIG. 3A in that following either 308 or 310, instead of the method ending, the method loops back to 302, and 302 through 306 are repeated to verify that the current operative state of the first node 202 is consistent with the expected operative state. This iterative process may be repeated until the operative state of the first node 202 is consistent with the expected operative state.

In yet a further embodiment, if at 304 the first domain controller 210 has not received a response message from the first node 202, then before proceeding with 308, the first controller 210 will issue a further status request message to the first node 202. Only where a response to the further status request message is not received within the predetermined threshold time period, does the first controller 210 proceed with outputting the control signal to cause the operative state of the first node 202 to be reset, at 308. In alternative embodiments it is envisaged that the first domain controller 210 may issue an arbitrary number of further status request messages before outputting the control signal at 308. This helps to avoid accidental resetting of the first node's operative state. Furthermore, it is also envisaged that the predetermined time period threshold may be varied for subsequently issued further status request messages. For example, for each subsequently issued status request message, the predetermined threshold time period may be extended by a predetermined amount. Once the predetermined number of further status request messages have been issued without receipt of a response message from the first node 202, then the domain controller 210 proceeds with 308.

In certain embodiments, the domain controller 210 may perform the method of either FIG. 3A or 3B periodically, to ensure that the first node is operating in the correct operative state. It is to be appreciated that whilst for illustrative purposes the aforementioned methods have been described with respect to the domain controller 210 ensuring that the first node 202 is operating in the expected operative state, the same methods may be repeated with each node operatively coupled to the sub-network associated with the domain controller. In other words, the methods may be carried out for each node operatively connected to the vehicular data network.

Figure 4A:
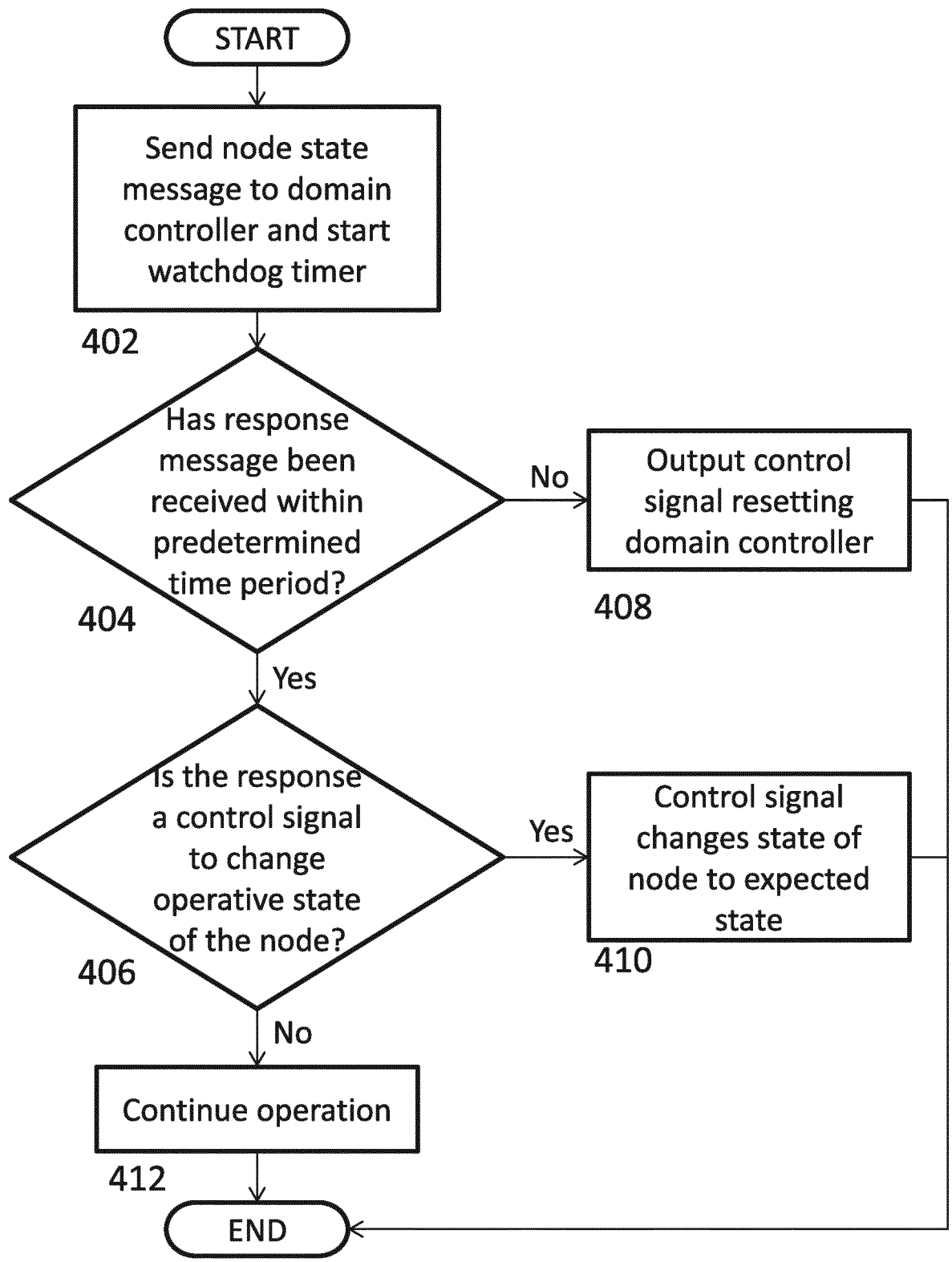
FIG. 4A is a process flow chart illustrating a method carried out by an electronic device operatively connected to the vehicular data communications network of FIG. 2, for communicating its operative state to the domain controller of FIG. 1, in accordance with an embodiment of the invention.

FIG. 4A is a process flow diagram illustrating the method carried out by a first node 202, in accordance with an embodiment of the present invention. The illustrated method is similar to the previously described method of FIGS. 3A and 3B, with the exception that it is initiated by the first node 202. In certain embodiments, the method may be initiated by a change in state of the first node 202. For example, when the first node 202 wakes from a dormant state, or is powered to an ON state from an OFF state. Upon changing state, the first node 202 transmits a first data message to the first domain controller 210, at 402. The first data message comprises information informing the first domain controller 210 of the first node's current operative state. This information may subsequently be used by the first domain controller 210 to determine and to confirm to the first node 202 that it is in the expected operative state—in other words, that the first node is in the operative state that it should be in. If, at 404, the first node 202 does not receive a response from the first domain controller 210 within the predetermined amount of time, then the first node 202 outputs a first control signal to cause the operative state of the first domain controller 210, to be reset at 408. If instead, at 404, it is determined that a response message has been received from the first domain controller 210 within the predetermined time threshold, then the first node 202 determines, at 406, if the received response message from the first domain controller 210 comprises instructions instructing the first node to change its operative state to a different expected operative state. As described previously, the first domain controller 210 may determine if the current operative state of the first node 202 is consistent with an expected operative state by consulting the real-time database record associated with the first node 202. Instructions for causing the operative state of the first node 202 to be changed may then be comprised in the first domain controllers response message as required. If, at 406, the response message does not comprise any instructions to the first node 202 to cause it to change its operative state, then the first node 202 continues with its current operative state, at 412. If instead, at 406, the response message comprises instructions for the first node 202 to change its current operative state to a different expected operative state, then, at 410 the first node 202 changes its operative state to the expected operative state.

Figure 4B:
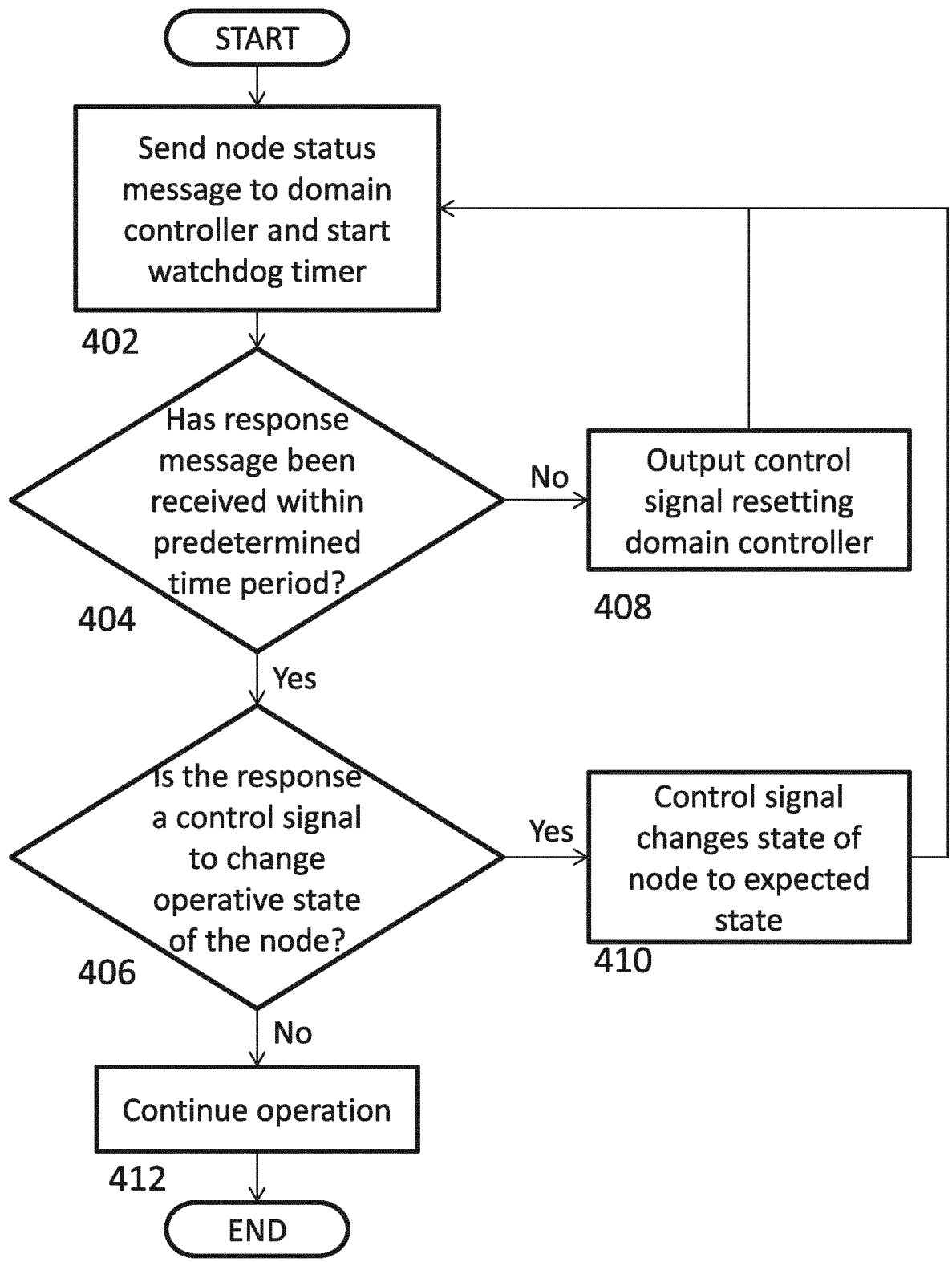
FIG. 4B is a process flow chart illustrating an alternative to the method of FIG. 4A, carried out by the electronic device operatively connected to the vehicular data communications network of FIG. 2.

FIG. 4B illustrates a modified iterative method that may be carried out by the first node 202, in further embodiments of the invention. For present purposes, any steps that are shared with steps illustrated in the method of FIG. 4A, share the same reference numeral. The method of FIG. 4B differs from the method of FIG. 4A in that following 408 or 410, instead of the method ending, 402 through 406 are repeated to confirm that the first node 202 is in the correct operative state.

In yet a further embodiment, if at 404 the first node 202 has not received a response message from the first domain controller 210, then before proceeding with 408, the first node 202 will issue a further status message to the first domain controller 210. Only where a response to the further status message is not received within the predetermined threshold time period, does the first node 202 proceed with outputting the control signal to cause the operative state of the first domain controller 210 to be reset, at 408. In alternative embodiments it is envisaged that the first node 202 may issue an arbitrary number of further status messages before outputting the control signal at 408. This helps to avoid accidental resetting of the first domain controller 210. Furthermore, it is also envisaged that the predetermined time period threshold may be varied for subsequently issued further status messages. For example, for each subsequently issued status message, the predetermined threshold time period may be extended by a predetermined amount. Once the predetermined number of further status messages have been issued without receipt of a response message from the first domain controller 210, the first node 202 proceeds with 408.

In certain embodiments, if the first node 202 continues to receive no response message from the domain controller 210 after outputting a control signal to reset the domain controller, the first node 202 may be configured to output a control signal to itself to cause its own operative state to be reset (e.g. to put itself back into a dormant state or a powered-off state).

In certain embodiments, the first node 202 may perform the method of either FIG. 4A or 4B periodically, to ensure that the first node is operating in the correct operative state.

In certain embodiments where the first domain controller 210 or the first node 202 receive a control signal for causing the operative state of the respective first domain controller 210 or the first node 202 to be reset, the method may further comprise determining if the current operative state of the respective electronic device is associated with a critical operation of the vehicle 50. Each electronic device, including the first domain controller 210 and the first node 202, may be configured with a failsafe preventing cessation of an operative state associated with a critical function of the vehicle, until completion of the critical function. In certain embodiments the failsafe may be configured in the operating software of the respective electronic devices. Accordingly, should either electronic device receive a control signal for causing the current operative state of the respective electronic device to be changed to an expected operative state, when the current operative state is associated with a critical operation of the vehicle 50, then the electronic device only changes its operative state to the expected operative state, on or after completion of the critical operation. In practice, a critical operation of the vehicle may relate to a safety critical feature, for example activation of the brakes, or the ABS (Anti-lock Brake System) system. The failsafe prevents interference with a critical operation of the vehicle before the operation is completed.

In yet further embodiments, critical operations of the vehicle may relate to any operation, which must be completed before an operative state change may occur, and need not necessarily relate exclusively to safety features of the vehicle. The critical operations may be defined in the operating systems of the electronic devices. For example, in certain embodiments the critical operation may relate to winding up a window, or any other operation that a user would not want terminated halfway. Similarly, activation of windscreen wipers may be another example of a critical operation that may only be terminated on completion of a wiper stroke, to avoid the windscreen wipers stopping halfway through a stroke thereby obstructing the drivers view.

In yet further embodiments, the electronic device may relate to a remotely located device, such as a mobile telephone, and the method may include receiving a control signal from the remotely located electronic device. The control signal may specify the desired operative state of a first electronic device. The expected operative state of the first electronic device may also be updated in accordance with the desired operative state specified in the received signal. The mobile telephone may belong to the owner of the vehicle. In this way, it is possible for a user of the vehicle 50 to control operation of a node located in their vehicle 50, from their mobile device, remotely connected to the vehicle data communications network 200 (for example via Bluetooth™ connection).

For example, the control signal from the external electronic device may be received by a telematics control system (not shown in the figures) located within the vehicular data communications network 200. The telematics control system may be configured to forward the received control signal to the domain controller operatively connected to the bus comprising the node that the user wishes to activate or otherwise control operation of. The domain controller then may perform at least two actions. It may transmit a data control signal to the desired node in order to change its operative state, and it may update the database to reflect the new expected operative state of the node. The order in which these two actions are carried out is immaterial for present purposes. In certain embodiments the domain controller may write to the database prior to sending the data communication signal to the node.

The operative state of the electronic devices may include, but is not limited to: a power status of the electronic device, or a mode of operation of the electronic device.

In certain embodiments, the data messages or control signals exchanged between domain controllers and nodes may be compliant with the AutoSar™ vehicle data communications standard. An advantage associated with this is that the present methods may be incorporated into the existing AutoSar™ standard, without requiring further adaptation. This may be achieved by using the free blocks present in the existing AutoSar™ data messages, and by using the existing timer functionality currently built into AutoSar™. The existing free data slots comprised in the AutoSar™ standard provide enough memory to contain the previously mentioned requests, messages and control signals associated with the above methods. The existing AutoSar™ standard does not need to be modified.

Figure 5:
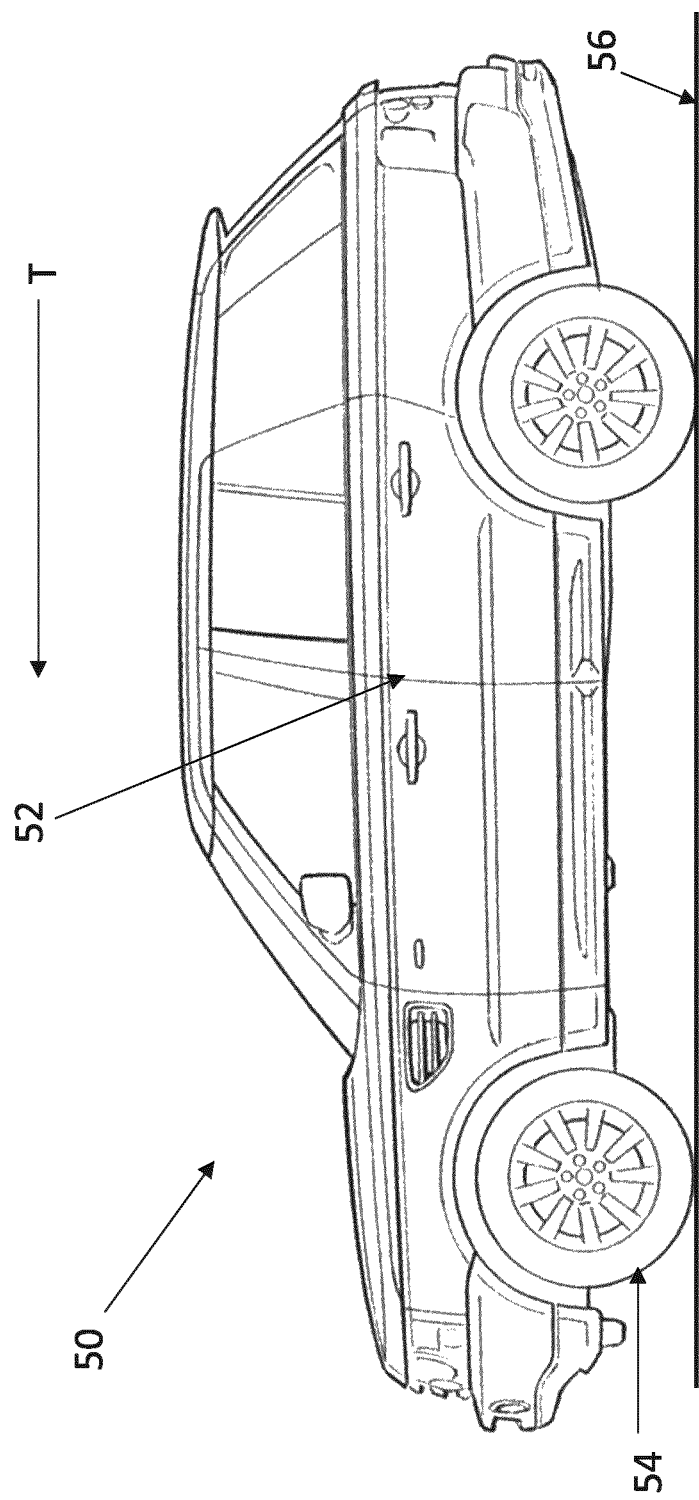
FIG. 5 is a diagram of a vehicle comprising the domain controller of FIG. 1, and the data communications network of FIG. 2, and arranged to carry out the methods of any one of FIG. 3A, 3B, 4A or 4B, in accordance with an embodiment of the invention.

FIG. 5 illustrates a side view of a vehicle 50 comprising the electronic devices of the present invention, including the domain controller and the node, and which is configured to carry out the herein described methods of the invention.

In certain embodiments the vehicle 50 may be an autonomous vehicle, for example, a self-driving car.

It should be appreciated that the term 'vehicle' may include but is not limited to a land vehicle, watercraft or aircraft. The vehicle may be a transport vehicle for transporting people and/or cargo. The vehicle may be any of a wheeled, tracked, or skied vehicle. The vehicle may be a motor vehicle including but not limited to, a car, a lorry, a motorbike, a van, a bus, a coach.

It will be appreciated that various changes and modifications can be made to the present invention without departing from the scope of the present application.

The invention claimed is:

1. A vehicle electronic control unit configured to be operatively connected to a data communications network within a vehicle, wherein the vehicle electronic control unit is configured to:
   transmit a first message to a further vehicle electronic control unit connected to the data communications network; and
   output a first control signal to cause an operative state of the further vehicle electronic control unit to be reset, in dependence on the vehicle electronic control unit not having received a response message from the further vehicle electronic control unit within a time period from transmission of the first message that is equal to a predetermined time period threshold.

2. The vehicle electronic control unit of claim 1, wherein the first message comprises a current operative state of the vehicle electronic control unit; and
   the vehicle electronic control unit is configured to transmit the first message in response to a request from the further vehicle electronic control unit for the current operative state of the vehicle electronic control unit.

3. The vehicle electronic control unit of claim 1, wherein the first message comprises a current operative state of the vehicle electronic control unit;
   the vehicle electronic control unit is configured to receive a second control signal from the further vehicle electronic control unit indicating an expected operative state; and
   upon receipt of the second control signal, the vehicle electronic control unit is configured to change the operative state of the vehicle electronic control unit from the current operative state to the expected operative state.

4. The vehicle electronic control unit of claim 1, wherein the first message comprises a request for a current operative state of the further vehicle electronic control unit.

5. The vehicle electronic control unit of claim 4, wherein, a response message responding to the first message comprises an indication of a current operative state of the further vehicle electronic control unit; and
   upon receipt of the response message, the vehicle electronic control unit is configured to:
      determine if the current operative state of the further vehicle electronic control unit is consistent with an expected operative state of the further vehicle electronic control unit; and
      output a second control signal to cause the operative state of the further vehicle electronic control unit to be changed to the expected operative state of the further vehicle electronic control unit, if the current operative state of the further vehicle electronic control unit is not consistent with the expected operative state of the further vehicle electronic control unit.

6. The vehicle electronic control unit of claim 5, wherein the vehicle electronic control unit is configured to:

determine if the current operative state of the further vehicle electronic control unit is associated with a critical operation of the vehicle; and output the second control signal once the critical operation has been completed.

7. The vehicle electronic control unit of claim 4, wherein the vehicle electronic control unit is configured to determine if the current operative state of the further vehicle electronic control unit is consistent with an expected operative state by:

accessing a database comprising a real-time database record of the expected operative state of the further vehicle electronic control unit; and comparing the current operative state of the further vehicle electronic control unit with the expected operative state associated with the real-time database record.

8. The vehicle electronic control unit of claim 7, wherein the vehicle electronic control unit is configured to:

receive a signal from a remote vehicle electronic control unit located remotely from the vehicle, the signal specifying a desired operative state of the further vehicle electronic control unit; and updating the expected operative state of the further vehicle electronic control unit in accordance with the desired operative state specified in the signal received from the remote vehicle electronic control unit.

9. An assembly comprising the vehicle electronic control unit of claim 1 and the vehicle data communications network.

10. A vehicle comprising the vehicle electronic control unit of claim 1.

11. A vehicle electronic control unit configured to be operatively connected to a data communications network within a vehicle, wherein the vehicle electronic control unit is configured to:

receive a first message from a further vehicle electronic control unit connected to the data communications network, wherein the first message comprises a current operative state of the further vehicle electronic control unit;

determine if the current operative state of the further vehicle electronic control unit is consistent with an expected operative state; and output a response message to the further vehicle electronic control unit, the response message comprising a control signal to cause the operative state of the further vehicle electronic control unit to be changed to the expected operative state, if the current operative state of the further vehicle electronic control unit is not consistent with the expected operative state.

12. The vehicle electronic control unit of claim 11, wherein the vehicle electronic control unit is configured to determine if the current operative state of the further vehicle electronic control unit is associated with a critical operation of the vehicle; and output the response message comprising the control signal to cause the operative state of the further vehicle electronic control unit to be changed to the expected operative state after the critical operation has been completed.

13. The vehicle electronic control unit of claim 11, wherein the vehicle electronic control unit is configured to determine if the current operative state of the further vehicle electronic control unit is consistent with the expected operative state by:

accessing a database comprising a real-time database record of the expected operative state of the further vehicle electronic control unit; and comparing the current operative state of the further vehicle electronic control unit with the expected operative state associated with the real-time database record.

14. The vehicle electronic control unit of claim 13, wherein the vehicle electronic control unit is configured to:

receive a signal from a remote vehicle electronic control unit located remotely from the vehicle, the signal specifying a desired operative state of the further vehicle electronic control unit; and updating the expected operative state of the further vehicle electronic control unit in accordance with the desired operative state specified in the signal received from the remote vehicle electronic control unit.

15. An assembly comprising the vehicle electronic control unit of claim 11 and the vehicle data communications network.

16. A vehicle comprising the vehicle electronic control unit of claim 11.

17. A method of communication between a first vehicle electronic control unit operatively connected to a data communications network within a vehicle and a second vehicle electronic control unit operatively connected to the data communications network, the method comprising:

transmitting a first message from the first vehicle electronic control unit to the second vehicle electronic control unit; and outputting from the first vehicle electronic control unit a first control signal to cause an operative state of the second vehicle electronic control unit to be reset, in dependence on the first vehicle electronic control unit not having received a response from the second vehicle electronic control unit within a time period from transmission of the first message that is equal to a predetermined time period threshold.

18. A non-transitory storage medium containing a computer program comprising instructions for carrying out the method of claim 17.

* * * * *